United States Patent [19]

Brown

[11] Patent Number: 4,637,662
[45] Date of Patent: Jan. 20, 1987

[54] ANTI-LOCKING MODULATING VALVE FOR DISPLACEMENT TYPE FULL POWER MASTER CYLINDER

[75] Inventor: G. Emerson Brown, Niles, Mich.

[73] Assignee: Allied Corporation, Morristown, N.J.

[21] Appl. No.: 789,202

[22] Filed: Oct. 18, 1985

[51] Int. Cl.⁴ ............... B60T 8/02; B60T 13/18; B60T 13/68
[52] U.S. Cl. ............... 303/6 R; 303/10; 303/13; 303/92; 303/115; 303/116; 303/119; 303/117
[58] Field of Search ............ 303/119, 117, 113, 114, 303/92, 68–69, 61–63, 13–15, 6 R, 2, 115, 116, DIG. 1, DIG. 2, 10, 84 A, 84 R; 188/181, 358–359, 151 A; 65/547.1, 591

[56] References Cited

U.S. PATENT DOCUMENTS

| | | | |
|---|---|---|---|
| 3,503,655 | 3/1970 | Heimler | 303/92 X |
| 3,674,317 | 7/1972 | Mangold | 303/92 X |
| 3,975,061 | 8/1976 | Kondo et al. | 303/115 |
| 4,129,341 | 12/1978 | Pauwels | 303/10 X |
| 4,182,536 | 1/1980 | Pauwels | 303/115 |
| 4,264,109 | 4/1981 | Knox et al. | 303/84 A X |
| 4,404,803 | 9/1983 | Steffes | 303/13 X |
| 4,492,413 | 1/1985 | Belart et al. | 303/92 |

*Primary Examiner*—Douglas C. Butler
*Attorney, Agent, or Firm*—Ronald D. Welch; Ken C. Decker

[57] ABSTRACT

Disclosed is an integrated isolation/modulation valve for use in an anti-lock brake system which incorporates a spool valve element and a solenoid actuated valve. The solenoid actuated valve responds to control signals from an anti-lock brake system, the valve being normally closed and operable to an open position to produce a differential pressure across the spool valve. Movement of the spool valve in response to the differential pressure interrupts fluid communication between the brake system's master cylinder and wheel cylinders and simultaneously connects the wheel cylinder to the system's pressurized fluid source through an orifice which effects controlled building of brake pressure.

8 Claims, 2 Drawing Figures

ANTI-LOCKING MODULATING VALVE FOR DISPLACEMENT TYPE FULL POWER MASTER CYLINDER

The present invention relates to control valves for use in anti-lock braking systems and, in particular, to an integrated control valve which incorporates a spool valve element and solenoid actuated valve responsive to differential pressure and control signals, respectively, to effect brake cylinder isolation, pressure build, and pressure decay cycles.

Anti-lock braking systems are well-known. Generally, anti-lock braking systems incorporate a sensor coupled to a vehicle wheel to sense the wheel's rotational velocity. An electronic control device processes this information and derives information such as wheel acceleration and deceleration to anticipate locking or skidding of a wheel during braking. The control device further generates control signals to modulate brake fluid pressure in accordance with predetermined or calculated parameters to prevent locking and/or skidding of a braked wheel. In one such system, pressurized braking fluid is provided by a hydraulically boosted master cylinder. In this type of system, a motor driven pump and accumulator provide a source of pressurized braking fluid which is metered to a master cylinder under the control of a hydraulic control valve thereby providing power assist for braking. The master cylinder and boost source are coupled to the wheel brake cylinder through a series of solenoid actuated control valves, typically three such valves being provided for each control channel. The solenoid valves are actuated by control signals from the anti-lock control. One of the solenoid valves functions to isolate the wheel cylinder from the master cylinder and the other two solenoid valves are actuated to decay or increase (modulate) the application of pressurized fluid from the hydraulic booster to the wheel cylinder. Since the number of solenoid valves required to control each channel directly affects the cost and reliability of the anti-lock braking system, it is advantageous to provide a control valve which would reduce the number of valves required in such a system.

In its broader aspects, the invention is a control valve for use in an anti-lock braking system which includes a hydraulically boosted master cylinder, at least one wheel cylinder, and control means for generating brake pressure control signals in response to rotational behavior of a wheel.

The valve incorporates one valve element operable in response to a differential pressure (differential valve element) and a second valve element operable in response to control signals, to effect automatic modulation of brake fluid pressure to the wheel cylinder (modulating valve element). The differential valve element is connected between the boost pressure source or master cylinder output and the wheel cylinder. Under normal operating conditions, the differential valve element sees no differential pressure since the source pressure and wheel cylinder pressures are equal. This element is biased to a normal position wherein it establishes normal fluid communication between the master and wheel cylinders. The modulating valve normally closes fluid communication between the wheel cylinder and low pressure reservoir return. When a wheel lock condition is sensed, the modulating element (typically a solenoid operated valve element) operates to interrupt fluid communication between the source output and wheel cylinder and simultaneously connect the wheel cylinder to the return. Through appropriate porting, this produces a differential pressure across the differential valve element equal to the difference between the boost pressure (normally during an anti-lock condition) and wheel cylinder pressure (low because the return is open). This causes the differential valve to operate against its bias to block fluid communication between the master cylinder output and wheel cylinder. The differential valve element simultaneously opens a flow control orifice between the boost source and the wheel cylinder. The differential valve will remain in this position for so long as the wheel cylinder pressure is less than the boost source pressure. During this period, wheel cylinder pressure is modulated by cycling of the modulating valve to effect decay or fluid flow through the flow control orifice to effect pressure build. When the wheel lock condition ceases, the modulating valve is deenergized, the boost and wheel cylinder pressure again equalize, and the differential valve returns to a "normal" state establishing a normal power boosted braking system.

In a specific embodiment, the valve is provided with a body having a bore and a valve spool reciprocal in the bore between first and second operating positions. An inlet port connects the spool to a source of pressurized fluid such as a boost source from a motor driven pump and accumulator. Another port connects the opposite end of the spool to the wheel cylinder output port. A solenoid actuated valve normally closes the output port to return and is operable to a second position in which it interrupts fluid communication between the wheel cylinder and inlet port to cause a fluid pressure differential across the spool valve. When the spool valve moves to a second position, it establishes fluid communication from the pressurized fluid source to the wheel cylinder outlet port via a pressure build orifice to effect controlled building of brake pressure and blocks fluid communication between the inlet port and wheel cylinder outlet port. The solenoid actuated valve is further operable to open communication between the wheel cylinder and a low pressure return to reduce brake pressure in anticipation of skid conditions.

In one specific embodiment of the invention, the pressurized fluid from a boost source is applied to one end of the spool valve element axially opposite the wheel cylinder outlet port such that differential pressure is established between the wheel cylinder outlet port pressure and the boost pressure. In another specific embodiment, one end of the spool valve opposite the wheel cylinder outlet port is exposed to master cylinder pressure and the boost pressure is isolated from the wheel cylinder outlet port via the spool valve element thereby obviating loss of boost pressure in the event of brake line failure when the anti-lock braking system is in a non-energized state.

It is therefore an object of the invention to provide an integrated control valve for an anti-skid braking system having a spool element and solenoid actuated valve element to effect isolation, and control build and decay of brake pressure.

It is another object of the invention to provide such a valve which is compatible with full power braking systems using displacement type master cylinders with continuous boost supply pressure equal to master cylinder pressure.

Yet another object of the invention is to provide such a valve which can reduce or prevent loss of boost pressure in the event of a brake line failure.

Still another object of the invention is to provide such a valve in which a spool valve element is operable to effect isolation and control building of brake pressure in response to a differential pressure imposed across the spool valve in response to a signal to decay brake pressure.

These and other objects and purposes of the invention are more fully described and will be best understood in view of the following detailed description in conjunction with the attached drawings wherein:

FIG. 1 is a cross-sectional view of an integrated control-isolation valve in accordance with the invention shown in conjunction with portions of an anti-lock braking system; and FIG. 2 is a cross-section of an alternative embodiment of the invention which minimizes loss of boost pressure in the event of a brake line failure.

DESCRIPTION OF THE PREFERRED EMBODIMENT

Figure 1:
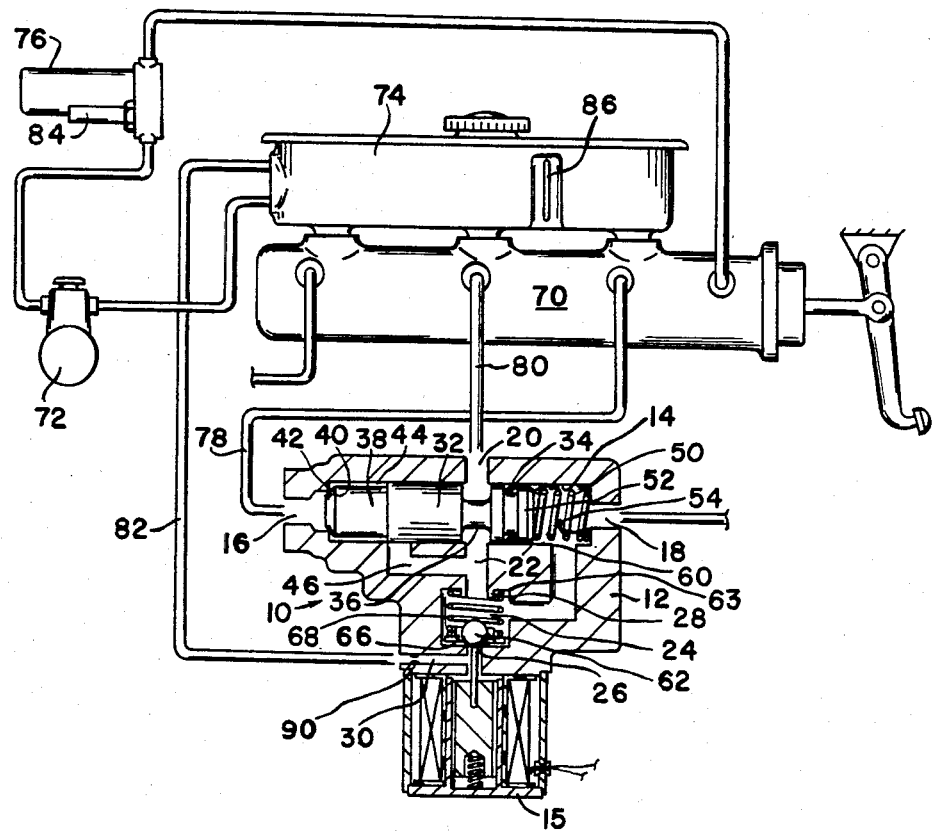

Referring now to FIG. 1, there is shown a control valve 10 which includes a valve body 12 and solenoid actuator 15. Valve body 12 has a cylindrical bore 14 extending between a boost pressure inlet port 16 and a wheel cylinder outlet port 18. A master cylinder inlet port 20 communicates laterally with the bore 14. A first fluid passage 22 extends downwardly (as viewed in the drawings) through the body 12 in a position in registry with master cylinder inlet port 20. Passage 22 is provided with an enlarged valve chamber 24 having valve seats 26, 28 at its opposite ends.

A fluid pressure decay port 30 extends outwardly from the body 12 from a point fluidly downstream from the valve seat 26. A second fluid passage extends between the valve chamber 24 connecting with the bore 14 adjacent wheel cylinder outlet port 18.

A spool valve element 32 is reciprocally received in the bore 14, having a close sliding fit therewith, and further being provided with an annular seal at 34 to provide a fluid tight seal between the opposite ends of the bore 14. Spool valve element 32 is further provided with a land 36 located in registry with master cylinder inlet port 20 and fluid passage 22 when the spool valve element 32 is in its left most (as viewed in the drawings) position. The left end 38 of a spool valve element 32 is tapered to form a valve seat 40 which fluid tightly engages a complementary valve seat 42 closing communication between booster inlet port 16 and bore 14.

Element 32 is undercut to define a pressure build orifice 44. Orifice 44 is dimensioned such that it is displaced from a fluid passage 46 which extends between the bore 14 and fluid passage 22 when element 32 is in its left most position and in communication therewith when element 44 moves to the right.

A helical spring 50 is compressed between the end 52 of element 32 and shoulder 54 defined by the bore 14 and outlet port 18. Spring 50 resiliently maintains element 32 in its illustrated position but permits element 32 to slide to the right (as viewed in the drawings). Preferably, bore 14 is provided with a small shoulder at 60 to limit its rightward movement such that element 32 will not block fluid communication between outlet port 18 and chamber 24 when it moves to its right most position.

A spherical ball valve element 62 is received in chamber 24 and fluid tightly engages valve seat 26. An annular spring seat 66 is fixedly attached to element 62 and the element 62 is engaged with seat 26 by another helical spring 68 compressed between shoulder 63 and spring seat 66. Ball valve element 62 can also be provided in the form of a poppet valve, flapper valve or the like.

The valve 10 is connected to a "full power" boosted type of master cylinder 70. In this type of system brake fluid pump 72 receives fluid from a system reservoir 74 and pumps the fluid under pressure into an accumulator 76. The output from the accumulator 76 is then applied to a hydraulic booster within the master cylinder 70. During a brake application, the accumulator pressure is metered to the master cylinder to power apply the pistons therein. This same boost supply is simultaneously supplied to brake pressure modulator valve 10 via a hydraulic line 78 and boost input port 16. Pressurized fluid is applied from master cylinder pistons to the valve 10 via line 80. The wheel cylinder output port 18 is connected to one or more brake wheel cylinders and a return conduit 82 returns brake fluid to the reservoir 74. Appropriate low pressure and fluid level indicators (not shown) 84, 86 may also be provided in the system.

During a normal brake application, pressurized brake fluid from the master cylinder output flows freely into the valve 10 past spool valve element 32, through the passage 22, to outlet port 18, and to the wheel cylinders. Under these conditions, the pressure at both ends of the element 32 is equal and valve spool element 32 is held against the boost shut-off seat 42 by a spring preload exerted by the spring 50. It should be noted that the end 38 of the spool valve element could also be provided with a reduced diameter and bore 14 stepped accordingly to provide a differential area between the opposite ends of the spool element 32 to assist in maintaining element 32 in its illustrated "closed" position.

Upon detection of a skid condition via wheel sensors and control logic (not shown), solenoid 15 is energized. This moves ball valve element 66 allowing pressurized brake fluid to pass from the wheel cylinder through the decay passage 30. This passage may be provided with an orifice 90 to control the rate of pressure drop on decay. The ball valve 66 further closes the valve seat 28 stopping the flow of fluid from master cylinder 70 through the valve 10. As the pressure of the brake fluid downstream from element 66 drops, a pressure differential develops across the spool valve element 32 causing it to move against the force of spring 50. This opens the boost supply port via fluid passage 46 and simultaneously shuts off the master cylinder port 20. When the system logic determines that it is necessary to build or increase braking pressure, the decay solenoid 14 is de-energized allowing ball valve element 66 to open the valve seat 28 and close decay passage 30. At this point, brake pressure is still lower than the master cylinder and boost pressures and therefore the spool is maintained in its right most position. Spool valve element 32 accordingly maintains closure of the master cylinder input port 20. Boost supply is metered via the orifice 44 and passage 46 to the output port 18 to rebuild or increase brake pressure at a controlled rate determined by the orifice 44 dimensions. When pressure in the brake circuit approximately equals the boost supply pressure, (this usually occurring after several anti-skid pressure decay-build cycles or at the end of a stop) spool valve element 32 will shift back to its illustrated position to reopen the master cylinder input port 20 and close the boost input port 16.

Since during normal skid control stops, a driver will increase master cylinder pressure after cycling of valve 10 begins, any increase of brake displacement which occurs during cycling is accommodated by the boost circuit. After cycling has ceased, the excess displacement (supercharge) is released through the master cylinder compensation valves (not shown) in conventional fashion.

It will further be noted that if the fluid line 80 should fail, spool valve element 32 will be caused to shift which in turn will isolate the leak and allow boost pressure to build brake pressure. When brake pressure reaches boost pressure, the spool will momentarily shuttle open releasing brake pressure through the brake which will again cause the spool to close and rebuild pressure in the brakes until eventually the boost pressure supply drops. A standard differential pressure switch can be used to detect this type of failure.

Similarly, if a brake line should fail, boost pressure will force the spool 32 to shift. This will allow boost supply fluid to bleed past orifice 44 and out through the broken line. This loss of boost will, however, not be sudden due to the orifice and gradual loss of boost would occur. This could result in loss of half of the brake system. This failure would be detected by a low fluid level or low accumulator pressure indicator (not shown).

Figure 2:
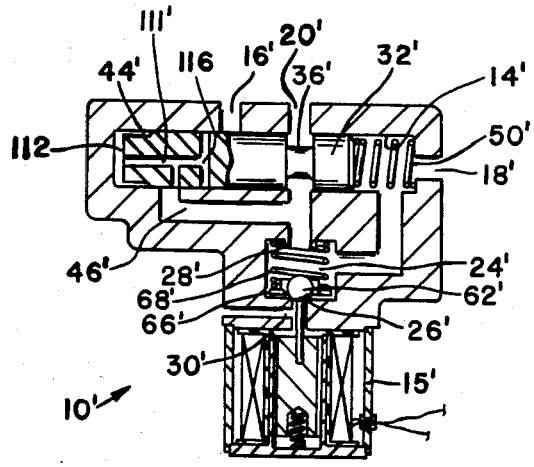

Referring now to FIG. 2, there is shown an alternative embodiment 10' of the control valve of the present invention in which like parts bear like but primed numerals. In this embodiment, boost input port 16' enters the cavity 14' laterally. Spool valve element 32' when in its left most, (illustrated) position, blocks the passage of fluid from the boost input port 16'. Element 32' is provided with a passage 111 which communicates the end 112 of the bore 14' with passage 46' when element 32' is positioned as illustrated, and with boost input port 16' through passage 116 when the valve element 32' moves to the right. Further, orifice 44' communicates end 112 with passage 46' when valve element 32' moves to the right.

Under normal braking conditions, the valve is as shown. The spool valve element 32' remains in this position under the influence of spring 50' because the master cylinder output pressure acting on end 112 of spool 32' and the wheel cylinder pressure at port 18' are equal. Actuation of the solenoid 15' in response to a lock condition causes movement of the valve element 32' to the right due to the reduction of wheel cylinder pressure at port 18. Boost pressure from port 16' is then maintained in the chamber 112 via fluid passages 116 and 111. Pressure decays through port 30'. When the solenoid 14' is de-energized, boost pressure flows past the build orifice 44' to rebuild brake pressure at a controlled rate. Valve element 32' will remain in its right "closed" position during cycling until brake pressure approximately equals boost pressure. In this embodiment, with a failure in the line from the master cylinder during normal braking (solenoid not energized), the spool valve element 32' does not shift since the reference pressure, that is, the pressure in chamber 112, is the same as that applied to the opposite end spool valve element 32'. Because there is no shift in spool valve element 32, the boost supply remains closed and is unaffected by the line failure. Failure of the line can be indicated by a pressure differential switch (not shown).

The embodiment of FIG. 2 can also be adapted for use in non-displacement braking systems in which pressurized fluid for both normal and anti-lock operation is provided from a power boost source. In this application, both ports 16' and 20' are connected to the boost source. This connection can be external or provided by an internal fluid passage (not shown) extending between ports 16' and 20'. Operation of the valve is otherwise as described above.

In view of the above description, it will be seen that the single, integrated control valve of the present invention provides all of the control functions necessary for one channel of an anti-lock braking system in a single unit and which incorporates one solenoid actuator and a spool valve element. This valve can, accordingly, replace multiple solenoid valves as used in prior art systems thereby effecting substantial simplification and reduced cost in such a system.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

I claim:

1. An integrated isolation/modulation valve for use in an anti-lock braking system which includes at least one brake wheel cylinder, a manually modulated source of pressurized brake fluid having an output and a return and operable to apply pressurized brake fluid to said brake wheel cylinder, and control means for generating brake pressure control signals in response to behavior of a wheel, comprising: a valve body having a bore, a differential pressure valve element therein reciprocal in said bore between first and second operating positions in response to a differential pressure thereacross, a first inlet port connecting one end of said bore to said manually modulated source output, a second inlet port connecting said bore to said manually modulated source output, an outlet port connecting the other end of said bore to said wheel cylinder, a decay port connected to said return, and a modulating valve means for normally providing communication between one of said input ports and said output port and closing said decay port and operable to a second position interrupting fluid communication between said one of said inlet ports and said outlet port and opening said outlet port to said decay port to cause said fluid pressure differential across said differential pressure valve element, biasing means biasing said differential pressure valve element to said first position to provide communication between said one of said inlet ports and said outlet port in the absence of said differential pressure, said differential pressure valve element blocking communication therebetween when in said second position, and orifice means communicating between said one of said inlet ports and said outlet port when said differential pressure valve element is in said second position for providing restricted flow of pressurized fluid therebetween when said differential pressure valve element is in said second position.

2. The valve of claim 1 wherein said differential pressure valve element includes a land disposed in registry with said one inlet port and a fluid passage connected to said outlet port when said differential pressure valve element is in said first position.

3. The valve of claim 1 wherein said modulating valve element is a ball valve and further including spring means for maintaining said ball valve in a normally closed position.

4. The valve of claim 3 further including a solenoid actuator operatively engaging said ball valve element.

5. The valve of claim 1 wherein said first inlet port and said outlet port are connected to opposite ends of said bore, said valve element being a spool valve element.

6. The valve of claim 1 wherein said manually modulated source includes a master cylinder and a hydraulic booster, said first inlet port being connected directly between said booster and said one end of said bore, said second inlet port being connected the output of to said master cylinder.

7. The valve of claim 1 wherein said manually modulated source includes a master cylinder and a booster, said second inlet port being connected to said booster, said first inlet port being connected to said master cylinder, said first inlet port including a first fluid passage in said differential valve element, there being a second fluid passage in said valve body, said first passage communicating between said second passage and said first inlet port, and between said second inlet port when said differential valve element is in said first and second positions, respectively.

8. The valve of claim 1 wherein said manually modulated source is a booster, said first and said second inlet ports being connected to said booster, said first inlet port including a first fluid passage in said differential valve element, there being a second fluid passage in said valve body, said first passage communicating between said second passage and said first inlet port, and between said second passage and said second inlet port when said differential valve element is in said first and second positions, respectively.

* * * * *